United States Patent
Maeda

(10) Patent No.: US 6,901,774 B2
(45) Date of Patent: Jun. 7, 2005

(54) AIR-COOLING/TEMPERING DEVICE FOR A GLASS PLATE

(75) Inventor: Kenji Maeda, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 443 days.

(21) Appl. No.: 10/260,428

(22) Filed: Oct. 1, 2002

(65) Prior Publication Data

US 2003/0074923 A1 Apr. 24, 2003

(30) Foreign Application Priority Data

Oct. 2, 2001 (JP) .......................... 2001-306160

(51) Int. Cl.[7] .......................... C03B 27/044
(52) U.S. Cl. .......................... 65/348; 65/114
(58) Field of Search .......................... 65/114, 348–351

(56) References Cited

U.S. PATENT DOCUMENTS

| | | | | |
|---|---|---|---|---|
| 3,315,774 A | * | 4/1967 | Leflet, Jr. .................. | 193/37 |
| 4,157,910 A | * | 6/1979 | Imler .......................... | 65/351 |
| 4,883,527 A | * | 11/1989 | McMaster et al. .......... | 65/273 |
| 5,846,281 A | * | 12/1998 | Nikander et al. ........... | 65/114 |
| 2004/0093903 A1 | * | 5/2004 | Hirvonen .................... | 65/289 |
| 2004/0216489 A1 | * | 11/2004 | Maeda et al. ............... | 65/114 |

FOREIGN PATENT DOCUMENTS

| | | |
|---|---|---|
| EP | 0 249 161 | 12/1987 |
| EP | 0 261 611 | 3/1988 |
| JP | 2000-281369 | 10/2000 |
| JP | 2002-193631 | 7/2002 |
| WO | WO 95/11202 | 4/1995 |
| WO | WO 96/13465 | 5/1996 |
| WO | WO 02/074705 | 9/2002 |

OTHER PUBLICATIONS

Patent Abstracts of Japan, JP 2000–281369, Oct. 10, 2000.

* cited by examiner

*Primary Examiner*—Sean Vincent
(74) *Attorney, Agent, or Firm*—Oblon, Spivak, McClelland, Maier & Neustadt, P.C.

(57) ABSTRACT

An air-cooling temperature device for a glass plate including a plurality of upper blowing heads for blowing air to an upper face of a bend-shaped glass plate heated to a high temperature and a plurality of lower blowing heads for blowing air to a lower face of the glass plate, wherein a first link mechanism including a plurality of four-bar linkages and being formed by connected a plurality of units each having a common link a first connecting link mechanism and a second link mechanism.

9 Claims, 4 Drawing Sheets

AIR-COOLING/TEMPERING DEVICE FOR A GLASS PLATE

The present invention relates to an air-cooling/tempering device for a glass plate. In particularly, the present invention relates to an air-cooling/tempering device for a glass plate suitable for cooling and tempering the glass plate by blowing cooling air to both surfaces of a glass plate which is bend-shaped and under a high temperature condition.

There has been known an apparatus for producing a curved glass plate such as a window glass for an automobile or the like by heating a glass plate to around its softening temperature in a heating furnace; bend-shaping it with a shaping mold and quenching it in an air-cooling/tempering device.

The air-cooling/tempering device comprises a plurality of upper blowing heads and a plurality of lower blowing heads. When a curved glass plate is put between these upper and lower blowing heads, cooling air is blown to an upper face of the curved glass plate from injection nozzles of the upper blowing heads and cooling air is blown to a lower face of the curved glass plate from injection nozzles of the lower blowing heads, whereby the glass plate can be cooled and tempered.

These upper blowing heads and lower blowing heads are provided at positions corresponding to the curved plane of the curved glass plate. Namely, each of these upper and lower blowing heads is arranged so that a curved line formed by connecting each air nozzle of the plurality of upper blowing heads and a curved line formed by connecting each air nozzle of the plurality of lower blowing heads are along front and rear curved planes of the curved glass plate. Further, the plurality of upper and lower blowing heads are arranged so that nozzles of the upper blowing heads oppose nozzles of the lower blowing heads so as to prevent the reduction of cooling performance.

In automobile industries, a demand of producing an article of small quantity and large variety has been increasing in recent years. In response to this, there is a demand of efficient production of a glass article of small quantity and large variety used for windows for automobile. In the conventional air-cooling/tempering device, however, it was necessary to disassemble upper blowing heads and lower blowing heads each time of changing a type of glass plate to another type of glass plate, and to assemble each of the blowing heads so as to be along the curved plane of the fresh type of glass plate. Accordingly, there was a disadvantage that a time for job change was long to decrease productivity.

The inventor of this application has proposed an air-cooling/tempering device for a glass plate (JP-A2000-281369) to solve the above-mentioned problem, wherein the combination of a plurality of link mechanisms can provide easily the radius of curvature corresponding to a curved plane of a glass plate.

However, in each of the link mechanisms in the air-cooling/tempering device, two links are connected together with a pin at each fulcrum point. Accordingly, when different kinds of force are applied to these two links, a bending moment acts on the pin, and there is a possibility of causing looseness in the link mechanisms and a danger that the pin is bent.

It is an object of the present invention to provide an air-cooling/tempering device for a glass plate wherein upper and lower blowing members are arranged so as to provide the optimum radius of curvature corresponding to a curved plane of a glass plate.

In accordance with the present invention, there is provided an air-cooling/tempering device for a glass plate comprising a plurality of upper blowing members for blowing air to an upper face of a bend-shaped glass plate heated to a high temperature and a plurality of lower blowing members for blowing air to a lower face of the glass plate, the air-cooling/tempering device for a glass plate being characterized by comprising a first link mechanism comprising a plurality of four-bar linkages and being formed by connecting a plurality of units each having a common link, a first connecting link connected to an end portion of the common link so as to be rotatable and a second connecting link connected to the other end of the common link so as to be rotatable, the first link mechanism being connected to the upper blowing members, and a second link mechanism comprising a plurality of four-bar linkages and being formed by connecting a plurality of units each having a common link, a first connecting link connected to an end portion of the common link so as to be rotatable and a second connecting link connected to the other end of the common link so as to be rotatable, the second link mechanism being connected to the lower blowing members so as to oppose the first link mechanism, wherein first connecting links of adjacent units in the first and second link mechanisms have respectively an end portion around which a gear cut portion is formed, and the first connecting links are connected to one end portions of the adjacent common links so as to be rotatable under the condition that gear cut portions of the first connecting links of adjacent units are meshed with each other, and the first link mechanism and the second link mechanism are respectively capable of swinging around a predetermined fulcrum point of swing.

According to the present invention, a pair of links each having the center of revolution in a common link are meshed with another pair of links in the same plane whereby the rigidity of the link mechanism can be improved and the looseness or deformation of the link mechanism can be prevented in comparison with the conventional technique.

In the present invention, it is preferable that second connecting links of adjacent units have respectively an end portion around which a gear cut portion is formed, and the second connecting links are connected to other end portions of the adjacent common links so as to be rotatable under the condition that the gear cut portions of the second connecting links of adjacent units are meshed with each other.

With such construction, the rigidity of the link mechanism is further improved and the looseness, deformation or the like of the link mechanism can be prevented.

Further, it is preferable that the first link mechanism can change the radius of curvature of a curved line formed by connecting the plurality of upper blowing members. It is also preferable that the second link mechanism can change the radius of curvature of the curved line formed by connecting the plurality of lower blowing members.

It is preferable that the first link mechanism and the second link mechanism are respectively arranged so as to operate in a plane perpendicular to the glass surface.

It is preferable that each of the upper and lower blowing members is a box-like member made of metal having a convex/concave surface so as to oppose the glass surface and a plurality of injection nozzles are formed in the convex surface which serves as air escape paths.

It is preferable that the plurality of injection nozzles are arranged in a zigzag form at the surfaces of the upper and lower blowing members.

It is preferable that the radius of curvature of each of the first and second link mechanisms is changed so that cooling air blown from the injection nozzles is directed perpendicular to the glass surface.

It is preferable that the glass plate is used for a window glass for an automobile.

Figure 1:
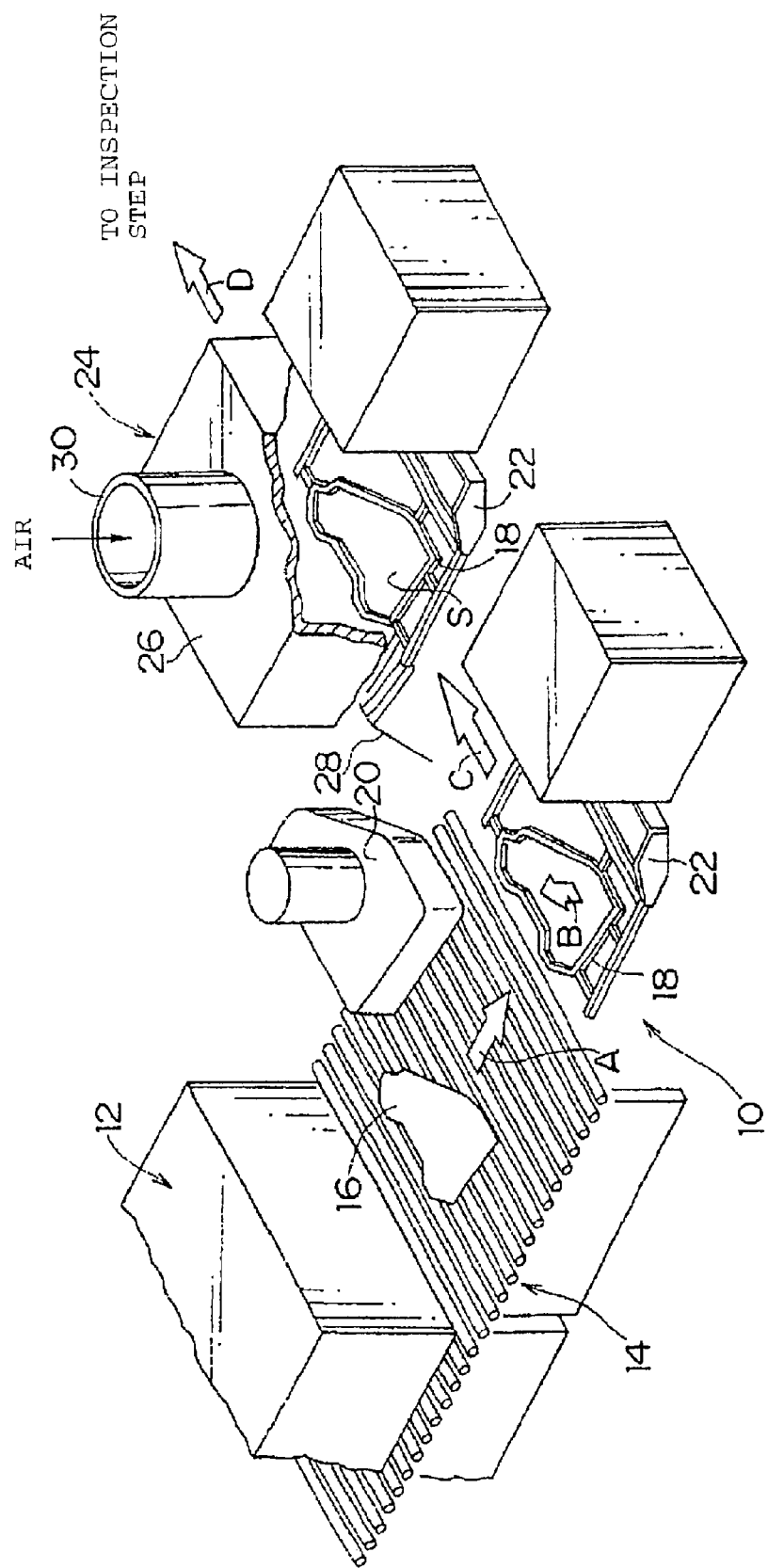
FIG. 1 is a diagram showing a bend-shaping apparatus to which the air-cooling/tempering device for a glass plate according to an embodiment of the present invention is applied.

Preferred embodiments of the air-cooling/tempering device for a glass plate according to the present invention will be explained with reference to the drawing.

In FIG. 1 showing the structure of a bend-shaping apparatus for a side window glass plate for an automobile including the air-cooling/tempering device for a glass plate according to an embodiment of the present invention, a heating furnace 12 is provided in a bend-shaping apparatus 10 at an upstream side in a direction of transferring a glass plate 16. A roller conveyer 14 is expended in the heating furnace 12. The glass plate 16 to be bend-shaped is transferred by the roller conveyer 14 into the heating furnace 12 in a direction indicated by an arrow mark A in FIG. 1. The glass plate 16 is heated to around the softening point (about 650 to 700° C.) when it reaches the outlet port of the heating furnace 12.

The heated glass plate 16 is transferred to the bend-shaping apparatus 10 by means of the roller conveyer 14, in which a circumferential portion of a lower face of the glass plate 16 is supported by a press ring 18 having a frame-like shape which is formed to correspond to the configuration of the glass plate 16. The glass plate 16 supported by the press ring 18 is moved toward an upper mold 20 due to an upward movement of the press ring 18 as shown in an arrow mark B in FIG. 1. The upper mold 20 has its lower portion in which a convex portion (not shown) is formed. Accordingly, the glass plate 16 ascended with the press ring 18 is pressed to the convex portion of the upper mold 20 so that it is bend-shaped into a shape corresponding to the convex portion. In this embodiment, the glass plate 16 is bend-shaped by fixing the upper mold 20 and ascending the press ring 18. However, the glass plate 16 may be bend-shaped by fixing the press ring 18 and descending the upper mold 20.

The glass plate 16 which has been subjected to the bend-shaping operation is moved in a direction of an arrow mark C in FIG. 1 in a state that it is supported by the press ring 18 by means of a moving device which moves the press ring 18 in a horizontal direction, and the glass plate 16 is transferred into an air-cooling/tempering device 24.

The air-cooling/tempering device 24 is provided with an upper air-blowing box 26 and a lower air-blowing box 28 between which a glass processing stage S is interposed. A duct 30 is connected to each of the upper and the lower air-blowing boxes 26, 28, and a flower (not shown) is connected to each of ducts 30. When the blower is operated, cooling air generated by the blower is supplied to the upper air-blowing box 26 and the lower air-blowing box 28 through the ducts 30. Then, the cooling air is blown to the glass processing stage S, shown in FIG. 1, through a plurality of upper blowing heads (which correspond to the upper blowing members in claims) 32, 32 . . . arranged in the upper air-blowing box 26, and a plurality of lower blowing heads (which correspond to the lower blowing members in claims) 34, 34 . . . arranged in the lower air-blowing box 28. Thus, both surfaces of the glass plate 16 supported by the press ring 18 are cooled and tempered.

The glass plate 16 cooled to tempered by the cooling air is transferred to an inspection step by means of another moving device (not shown) moved in a direction of an arrow mark D in FIG. 1. In the inspection step, the glass plate 16 is inspected as to the presence or absence of a defect such as cracks or the like, and non-defective articles are transferred to a non-defective step and defective articles are transferred to a defective step respectively.

Figure 2:
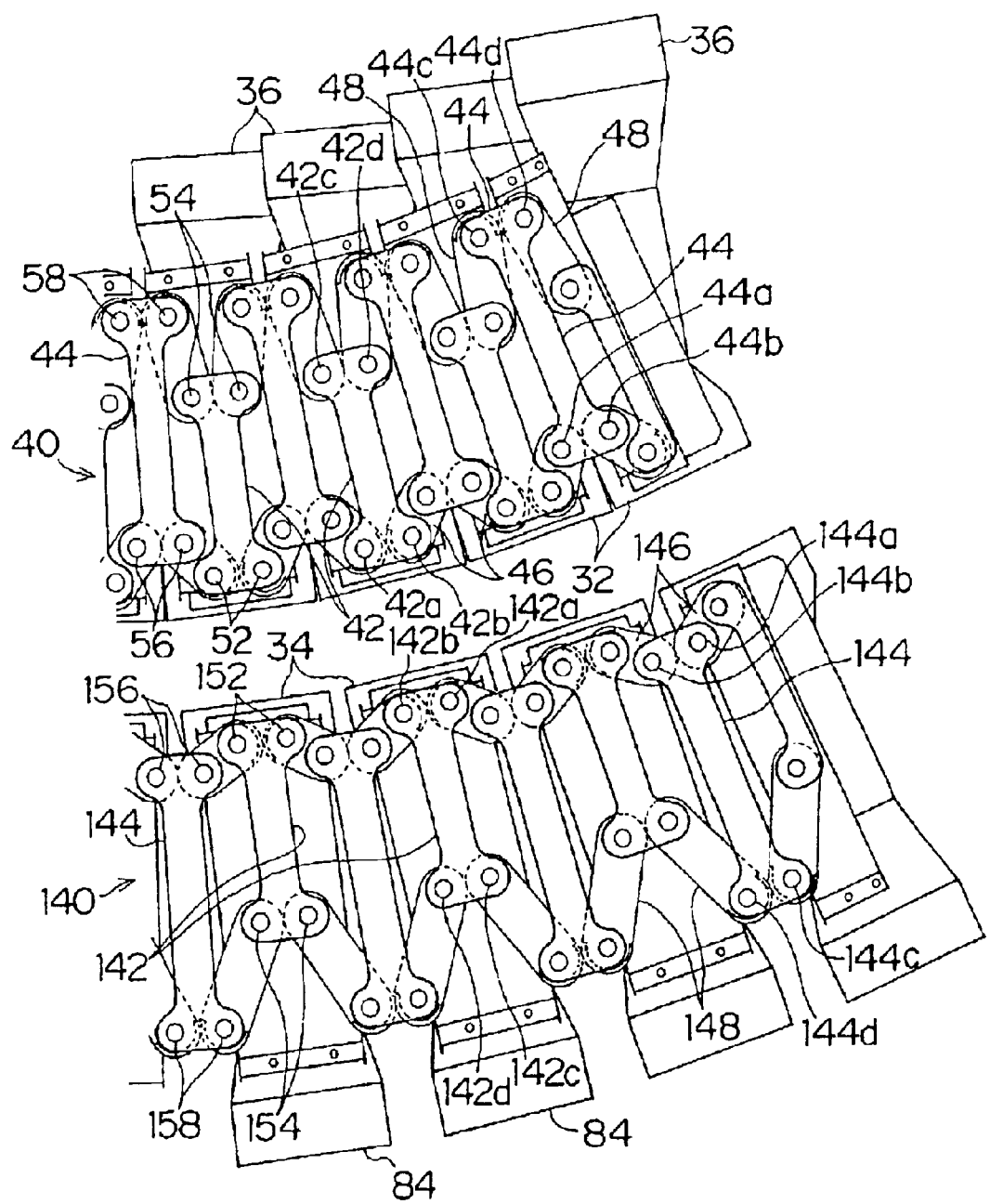
FIG. 2 is diagram showing the link mechanisms of the air-cooling/tempering device according to an embodiment of the present invention.
Figure 3:
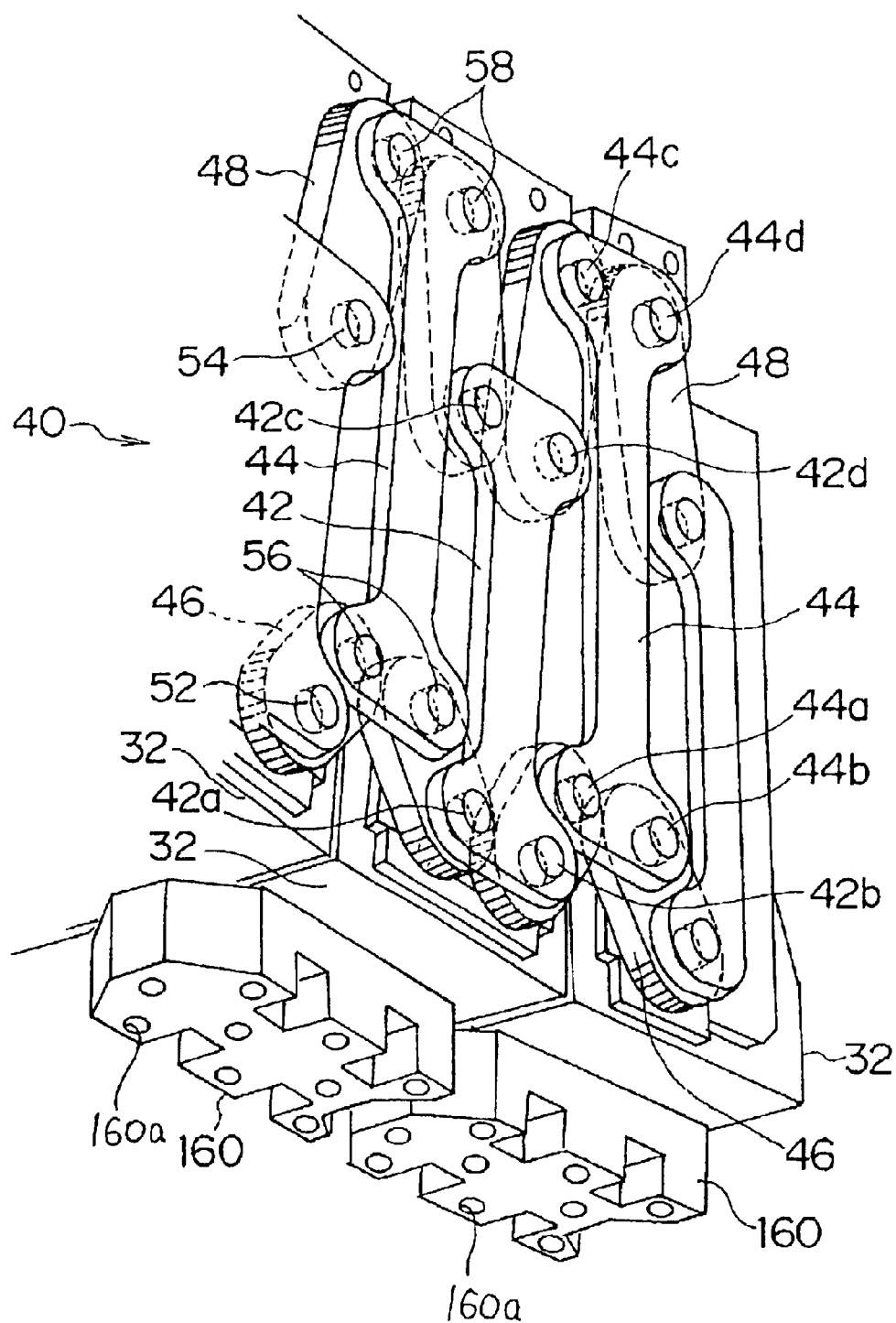
FIG. 3 is an enlarged perspective view partly omitted of the link mechanism of the air-cooling/tempering device.

As shown in FIGS. 2 and 3, the air-cooling/tempering device 24 is provided with the above-mentioned plurality of upper blowing heads 32, 32, . . . and plurality of lower blowing heads 34, 34, . . .

Each of the plurality of upper blowing heads 32 32, . . . is an elongated box-like member made of a metallic plate. The plurality of upper blowing heads are arranged so that their longer side planes extend in a direction perpendicular to the paper surface of FIG. 2, and the longer side planes are determined to be longer than the length of the glass plate 16. Flexible tubes 36, 36, . . . are connected respectively to upper portions of the plurality of upper blowing heads 32, 32, . . . , and the flexible tubes 36 are connected to the duct 30 in FIG. 1. Accordingly, cooling air supplied to the duct 30 is introduced into the plurality of upper blowing heads 32, 32, . . . through the flexible tubes 36, 36, . . . Convex blocks 160, 160, . . . each having air injection nozzles are attached to a lower portion of each of the plurality of upper blowing heads 32, 32, . . . at predetermined intervals in a longitudinal direction of each upper blowing head 32 so that cooling air is injected downwardly from the injection nozzles.

As shown in FIG. 2, a first link mechanism 40 comprising four-bar linkages is disposed on one end planes in a longitudinal direction of the plurality of upper blowing heads 32, 32, . . . , and another first link mechanism 40 (not shown) is disposed on the other end planes in the longitudinal direction of the plurality of upper blowing heads 32, 32, . . . Adjacent upper blowing heads 32, 32, . . . are moved cooperatively by these first link mechanisms 40. Namely, each of the first link mechanisms 40 comprises a plurality of four-bar linkages connected to each other wherein each four-bar linkages comprises a substantially I-letter like link 42 (corresponding to the common link in claims), a link 44 (corresponding to the common link in claims), a lower link 46 (corresponding to the first connecting link in claims) and an upper link 48 (corresponding to the second connecting link in claims) which are disposed obliquely and connect the link 42 and the link 44, and pins 52, 54, 56, 58 as fulcrum members for connecting a link to another. The first link mechanisms 40, 40 disposed on both end planes in the longitudinal direction of the upper blowing heads are symmetric with respect to the upper blowing heads 32.

As the first link mechanism 40, 40 have the same structure, explanation will be made as to one of these first link mechanisms. The first link mechanism 40 comprises a unit comprising the link 42, the link 46 connected rotatably to an end portion of the link 42 by means of a pin 52 and the link 48 connected rotatably to the other end portion of the link 42 by means of a pin 54, and a unit comprising the link 44, the link 46 connected rotatably to an end portion of the link 44 by means of a pin 56 and the link 48 connected rotatably to the other end portion of the link 44 by means of a pin 58 wherein these units are connected alternately.

The link 42 and the link 44 are used commonly in adjacent four-bar linkages. Namely, two pin holes 42a, 42b are formed at lateral positions in a lower end portion of the link 42, and two pin holes 42c, 42d are formed at lateral positions in an upper end portion of the link 42.

A lower end portion of the left side link 46 with respect to, for example, a common link 42 in FIGS. 2 and 3, is disposed at a rear surface of the link 42 at the position corresponding to the pin hole 42a, and a pin 52 is penetrated through the pin hole 42a and the link 46 to be fixed to an upper blowing head 32. With this, the link 46 is connected rotatably to the link 42 by means of the pin 52.

A lower end portion of the right side link 46 with respect to the common link 42 is disposed at a rear surface of the link 42 at the position corresponding to the pin hole 42b, and a pin 52 is penetrated through the pin hole 42b and the link 46 to be fixed to the upper blowing head 32. With this, the link 46 is connected rotatably to the link 42 by means of the pin 52.

An end portion of the link 46 is formed to have a circular arch shape, and a gear cut portion is formed in a lower end portion of the link 46. The lower end portions of left and right side links 46, 46 connected to the link 42 are meshed with each other in the same plane. When one of these links 46 is rotated by a predetermined angle θ, the other link 46 is also rotated by the same angle θ.

A lower end portion of the left side link 48 with respect to, for example, a common link 42 in FIGS. 2 and 3, is disposed at a rear surface of the link 42 at the position corresponding to the pin hole 42c, and a pin 54 is penetrated through the pin hole 42c and the link 48 to be fixed to the upper blowing head 32. With this, the link 48 is connected rotatably to the link 42 by means of the pin 54.

A lower end portion of the right side link 48 with respect to the common link 42 is disposed at the rear surface of the link 42 at the position corresponding to the pin hole 42d, and a pin 54 is penetrated through the pin hole 42d and the link 48 to be fixed to the upper blowing head 32. With this, the link 48 is connected rotatably to the link 42 by means of the pin 54. Further, the link 42 is connected to the upper blowing head 32 by means of the pins 52, 52, 54 and 54.

Similarly, two pin holes 44a, 44b are formed at lateral positions in a lower end portion of the link 44. Two pin holes 44c, 44d are formed at lateral positions in an upper end portion of the link 44. An upper end portion of the left side link 46 is disposed at a rear surface of the link 42 at the position corresponding to the pin hole 42a, and a pin 56 is penetrated through the pin hole 44a and the link 46 so as to connect the link 46 to the link 44 in a rotatably manner. An upper end portion of the right side link 46 is disposed at the rear surface at the position corresponding to the pin hole 44b, and a pin 56 is penetrated through the pin hole 44b and the link 46 so as to connect the link 46 to the link 44 in a rotatable manner.

An upper end portion of the left side link 48 is disposed at a rear surface at the position corresponding to the pin hole 44c, and a pin 58 is penetrated through the pin hole 44c and the link 48 so as to connect the link 48 to the link 44 in a rotatable manner. An upper end portion of the right side link 48 is disposed at the rear surface at the position corresponding to the pin hole 44d, and a pin 58 is penetrated through the pin hole 44d and the link 48 so as to connect the link 48 to the link 44 in a rotatable manner.

An end portion of the link 48 is formed to have a circular arch shape, and a gear cut portion is formed in an upper end portion of the link 48. Upper end portions of left and right side links 48, 48 connected to the link 44 are meshed with each other in the same plane crossing perpendicular to the plane of the glass plate. When one of these links 48 is rotated by a predetermined angle θ, the other link 48 is also rotated by the same angle θ. The radius of curvature of a curved line formed by connecting the upper blowing heads or the lower blowing heads can be changed by the operation of these links.

In this embodiment, the gear cut portions are formed in only one pair of links (the links 46, 46 or the links 48, 48) in adjacent four-bar linkages in their one end portions so that the pair of links are meshed with each other. However, a construction that two pairs of links have gear cut portions at their both end portions so that the two pairs of links are meshed with each other, may be employed. Such construction is advantageous in that the operation of the first link mechanism can be assured.

Further, in this embodiment, the end portions of the meshed links are formed to have a circular arch shape. However, these end portions may be formed to have an elliptical shape, a parabolic shape or the like other than the circular arch shape when the angle of rotation is small.

In this embodiment, the conventional structure, as described in JP-A-2000-281369, that two links are connected together with a pin in an overlapping state at each fulcrum point is not employed, but a fulcrum point is provided for each link. Further, two links are meshed with each other in the same plane. Accordingly, there is no disadvantage resulted from the structure of JP-A-2000-281369. Accordingly, the radius of curvature formed by connecting the upper blowing heads can be changed stably so as to correspond to a curved plane of the glass plate 16.

Figure 4:
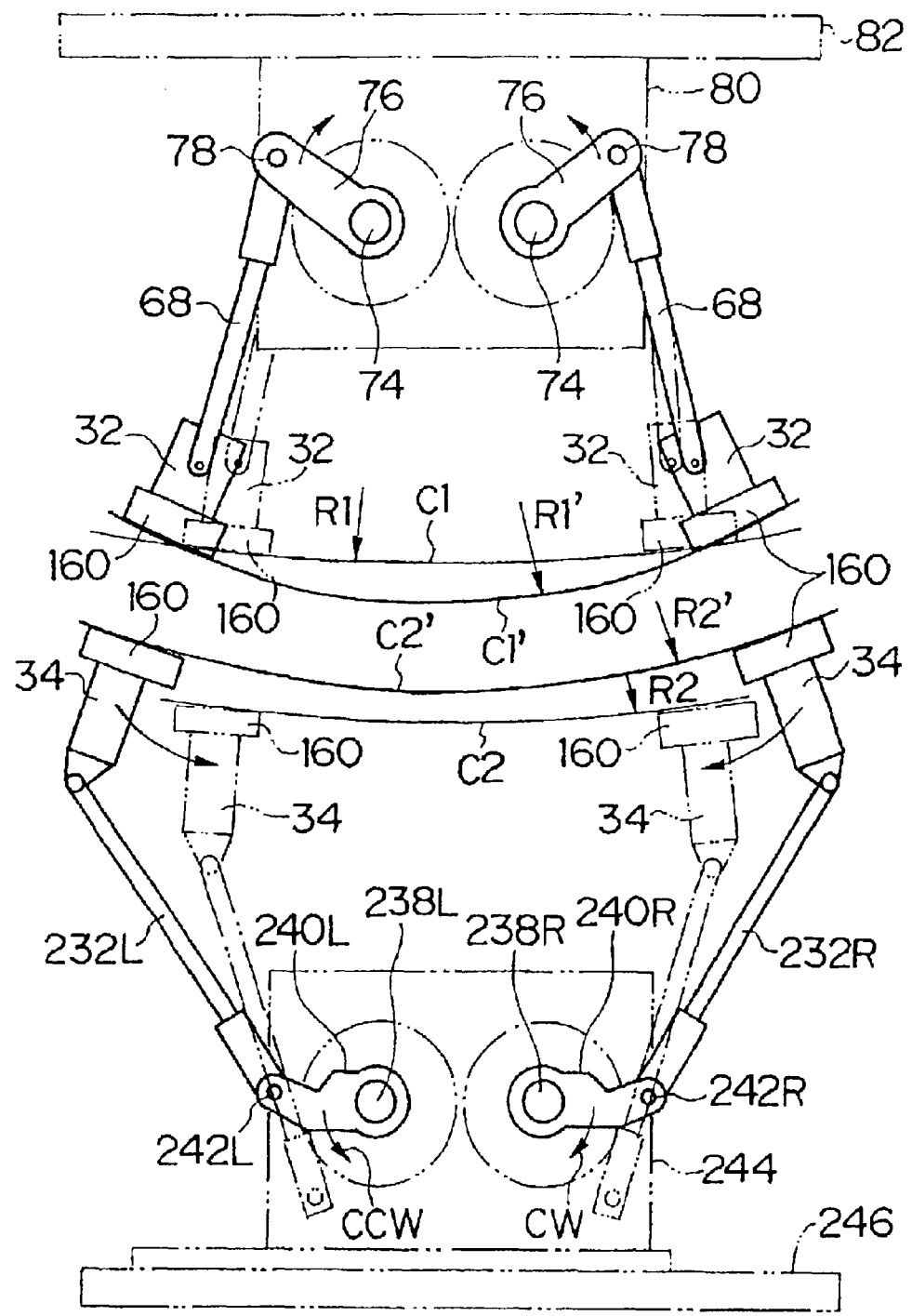
FIG. 4 is a diagram showing a driving unit for driving the link mechanisms of the air-cooling/tempering device of the present invention.

As shown in FIG. 4, upper blowing heads 32, 32 positioned at left and right ends, among the plurality of upper blowing heads 32, 32, . . . connected with the above-mentioned link mechanisms, are connected to lower end portions of arms 68, 68. Each of these arms 68, 68 is connected to each actuator comprising a motor, a worm mechanism (omitted from the drawing) and so on, and the arms are operated by a rotating action of shafts 74 connected to each actuator. As shown in FIG. 4, an upper end portion of each of the arms 68 is connected to a link 76, which is connected to the shaft 74, by means of a pin 78. Accordingly, when these shafts 74, 74 are rotated in arrow mark directions in FIG. 4, the upper end portions of the arms 68, 68 are moved so as to come close to each other. When these shafts 74, 74 are rotated in the opposite directions with respect to the arrow marks, the upper end portions of the arms 68, 68 are moved so as to separate from each other.

When the arms 68, 68 are moved as shown in FIG. 4, the upper blowing heads 32, 32, . . . are swung around a predetermined fulcrum point of swing (not shown) (the crossing point on the extension lines in the axial direction of the arms 68, 68) by the function of the first link mechanism. Namely, when the arms 68, 68 are moved so as to come close to each other, an angle formed by the link 46 or the links 48 with respect to a horizontal line becomes large. Such change of angle is transmitted in adjacent four-bar linkages so that the radius of curvature R1 of a curved line C1 formed by connecting the injection nozzles formed in each of the convex blocks 160, 160, . . . becomes large. On the other hand, when the arms 68, 68 are moved so as to separate from each other, the angle formed by the links 46 or the links 48 with respect to the horizontal line becomes small. Such change of angle is transmitted in adjacent four-bar linkages so that the radius of curvature R1' of a curved line C1' formed by connecting the injection nozzles formed in each of the convex blocks 160, 160, . . . becomes small. Accordingly, by controlling the amount of swinging of the arms 68, 68, the radius of curvature R1 can be changed to a desired radius of curvature whereby the radius of curvature R1 can be changed in response to the shape of a curved plane of the glass plate 16. In FIG. 4, reference numeral 80 designates a plate for supporting rotatably the shafts 74, 74 and numeral 82 designates a stand for supporting the motor and the worm mechanism (not shown).

The plurality of lower blowing heads 34, 34, . . . are elongated box-like members, and they are arranged so that their longer side planes extend in a direction perpendicular to the paper surface of FIG. 2. The length of the longer side planes is made longer than the length of the glass plate 16. A flexible tube 84 is connected to the lower portion of each of the plurality of lower blowing heads 34, 34, . . . , and each flexible tube 84 is connected to the duct 30. Accordingly, cooling air supplied to the duct 30 is introduced into the plurality of lower blowing heads 34, 34, . . . through flexible tubes 84. Then, cooling air is injected upwardly through air injection nozzles of convex blocks (having the same shape as the convex blocks 160 in FIG. 3) attached to upper portions of the plurality of lower blowing heads 34, 34, . . . at predetermined intervals in a longitudinal direction of the lower blowing heads 34.

As shown in FIG. 2, a second link mechanism 140 comprising four-bar linkages is disposed on one end planes of the plurality of lower blowing heads 34, 34, . . . in their longitudinal directions. Another second link mechanism 140 is also disposed on the other end planes of the plurality of lower blowing heads 34, 34, . . . in their longitudinal directions. Adjacent lower blowing heads 34, 34, . . . are connected by the second link mechanism 140 so as to move cooperatively.

The second link mechanism 140 has the same structure and function as the first link mechanism 140, and is symmetric in a vertical relation with the first link mechanism 40 with respect to the glass plate 16. Namely, the second link mechanism 140 take a position as if the first link mechanism 40 is inversed vertically. Accordingly, description of its structure and function is omitted.

The reference numeral of each structural element of the second link mechanism 140 is indicated by the reference numeral given by adding 100 to the reference numeral of each structural element of the first link mechanism 40. For example, a link in the second link mechanism has a reference numeral of 140 while a link in the first link mechanism has a reference numeral of 40 and a pin of the second link mechanism has a reference numeral of 152 while a pin in the first link mechanism has a reference numeral of 52.

As shown in FIG. 4, lower blowing heads 34, 34 positioned at left and right ends, among the plurality of lower blowing heads 34, 34, . . . are connected to upper end portions of arms 232L, 232R. These arms 232L, 232R are respectively connected to actuators each comprising a motor, a worm mechanism (not shown) and so on, and shafts 238L, 238R are rotated by the actuators. Namely, the arms 232L, 232R have their lower end portions which are connected to links 240L, 240R, which are in turn connected to the shafts 238L, 238R respectively, by means of pins 242L, 242R. When the shaft 238L is rotated in a direction of arrow mark CCW and the shaft 238R is rotated in a direction of arrow mark CW in FIG. 4, lower end portions of the arms 232L, 232R are moved so as to come close to each other. On the other hand, when the shafts 238L, 238R are rotated in the opposite directions with respect to the arrow marks, the lower end portions of the arms 232L, 232R are moved so as to separate from each other.

When these arms 232L, 232R are moved as shown in FIG. 4, the lower blowing heads 34, 34, . . . are swung around a predetermined fulcrum point of swing (not show) (the crossing point of extension lines in the axial directions of the arms 232L, 232R) by the function of the second link mechanism. Namely, when the arms 232L, 232R are moved so as to come close to each other, an angle formed by the links 146 or the links 148 with respect to the horizontal line becomes large. Such change of angle is transmitted in adjacent four-bar linkages so that the radius of curvature R2 of a curved line C2 formed by connecting the injection nozzles 160a formed in each of the convex blocks 160, 160, . . . , becomes large. On the other hand, when the arms 232L, 232R are moved so as to separate from each other, the angle formed by the links 146 or the links 148 with respect to the horizontal line becomes small. Such change of angle is transmitted in adjacent four-bar linkages so that the radius of curvature R2' of a curved line C2' formed by connecting the injection nozzles formed in each of the convex blocks 160, 160, . . . , becomes small. Accordingly, by controlling the amount of swinging of the arms 232L, 232R, the radius of curvature R2 can be changed to a desired radius of curvature. Thus, the radius of curvature R2 can be changed so as to correspond to a curved plane of the glass plate 16.

The second link mechanism is so designed that lower blowing heads 34, 34, . . . are swung while the injection nozzles of the lower blowing heads 34, 34, . . . oppose the injection nozzles of the upper blowing heads 32, 32, . . . In FIG. 4, reference numeral 244 designates a plate for supporting rotatably the shafts 238, 238 and reference numeral 246 designates a stand for supporting the motor and the worm mechanism (not shown).

Accordingly, according to the air-cooling/tempering device 24 having the construction as described above, the radius of curvature R1 of a curved line C1 formed by connecting injection nozzles formed in each of the upper blowing heads 32, 32, . . . can easily be changed so as to correspond to the curved shape of the glass plate 16 by swinging the upper blowing heads 32, 32, . . . around a predetermined fulcrum point of swing. Further, when the lower blowing heads 34, 34, . . . are swung around a predetermined fulcrum point of swing, the radius of curvature R2 of a curved line C2 formed by connecting the injection nozzles formed in each of the lower blowing heads 34, 34, . . . can be changed so as to correspond to the curved shape of the glass plate 16 in a state that the injection nozzles of the lower blowing heads 34, 34, . . . oppose the injection nozzles in the upper blowing heads 32, 32, . . .

According to the air-cooling/tempering device 24 in the above-mentioned embodiment, a loss of job change can substantially be reduced by changing the radii of curvature R1, R2. Accordingly, varieties of glass plates 16 having different curved planes can effectively be produced.

As described above, in the air-cooling/tempering device for a glass plate according to the present invention wherein a pair of links having their revolution centers in a common link are meshed with each other in the same plane, the rigidity of the link mechanism can be improved and the looseness or deformation of the link mechanism can be avoided in comparison with the conventional device. Further, the radius of curvature can stably be changed so as to correspond to the curved plane of a glass plate. The present invention is suitably applicable not only to a window glass for an automobile but also a window glass usable for buildings, air crafts and ships.

The entire disclosure of Japanese Patent Application No. 2001-306160 filed on Oct. 2, 2001 including specification, claims, drawings and summary is incorporated herein by reference in its entirety.

What is claimed is:

1. In an air-cooling/tempering device for a glass plate comprising a plurality of upper blowing members for blowing air to an upper face of a bend-shaped glass plate heated to a high temperature and a plurality of lower blowing members for blowing air to a lower face of the glass plate, the air-cooling/tempering device for a glass plate being characterized by comprising:

a first link mechanism comprising a plurality of four-bar linkages and being formed by connecting a plurality of units each having a common link, a first connecting link connected to an end portion of the common link so as to be rotatable and a second connecting link connected to the other end of the common link so as to be rotatable, the first link mechanism being connected to the upper blowing members, and a second link mechanism comprising a plurality of four-bar linkages and being formed by connecting a plurality of units each having a common link, a first connecting link connected to an end portion of the common link so as to be rotatable and a second connecting link connected to the other end of the common link so as to be rotatable, the second link mechanism being connected to the lower blowing members so as to oppose the first link mechanism, wherein first connecting links of adjacent units in the first and second link mechanisms have respectively an end portion around which a gear cut portion is formed, and the first connecting links are connected to one end portions of the adjacent common links so as to be rotatable under the condition that gear cut portions of the first connecting links of adjacent units are meshed with each other, and the first link mechanism and the second link mechanism are respectively capable of swinging around a predetermined fulcrum point of swing.

2. The air-cooling/tempering device for a glass plate according to claim 1, wherein second connecting links of adjacent units in the first and second link mechanisms have respectively an end portion around which a gear cut portion is formed, and the second connecting links are connected to other end portions of the adjacent common links so as to be rotatable under the condition that gear cut portions of the second connecting links of adjacent units are meshed with each other.

3. The air-cooling/tempering device for a glass plate according to claim 1, wherein the first link mechanism is adapted to change the radius of curvature of a curved line formed by connecting the plurality of upper blowing members.

4. The air-cooling/tempering device for a glass plate according to claim 1, wherein the second link mechanism is adapted to change the radius of curvature of a curved line formed by connecting the plurality of lower blowing members.

5. The air-cooling/tempering device for a glass plate according to claim 1, wherein the first link mechanism and the second link mechanism are respectively arranged so as to operate in a plane perpendicular to the glass surface.

6. The air-cooling/tempering device for a glass plate according to claim 1, wherein each of the upper and lower blowing members is provided with a convex block having a convex/concave surface so as to oppose the glass surface and a plurality of injection nozzles are formed in the convex surface which serves as an air escape path.

7. The air-cooling/tempering device for a glass plate according to claim 6, wherein the plurality of injection nozzles are arranged in a zigzag form at surfaces of the upper and lower blowing members.

8. The air-cooling/tempering device for a glass plate according to claim 6, wherein the radius of curvature of each of the first and second link mechanisms is changed so that cooling air blown from the injection nozzles is directed perpendicular to the glass surface.

9. The air-cooling/tempering device for a glass plate according to claim 1, wherein the glass plate is used for a window glass for an automobile.

* * * * *